3,045,694
MANUAL VALVE FOR GAS TORCHES
George L. Hammon, 32 Ross Circle, Oakland, Calif.
Filed July 16, 1958, Ser. No. 749,000
2 Claims. (Cl. 137—328)

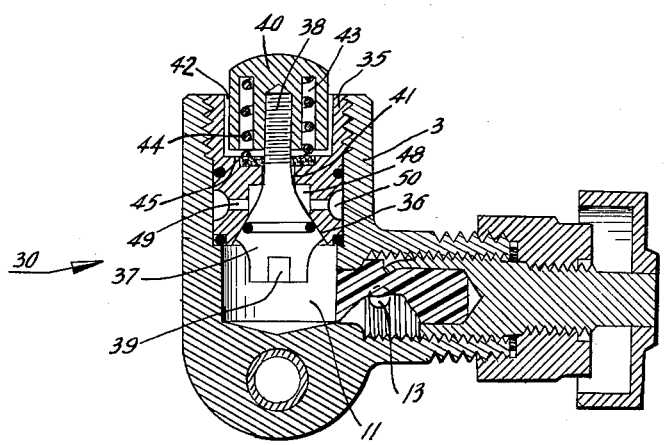

The present invention relates to gas torches of the type which commonly employ oxygen and acetylene to burn, or cut, metals, and particularly concerns improvements in the high pressure oxygen by-pass valve.

Gas cutting torches commonly employ two manually adjustable valves for controlling the flow of oxygen and acetylene to a mixer unit where the gases are mixed in the desired proportions. From the mixer unit, the gases pass through a plurality of passages in the burning tip to the end of the tip where they are ignited. The flame is applied to the metal plate, or like, which is to be cut, and after the plate is heated to the desired temperature, a third valve is opened which supplies raw oxygen, under pressure, through a relatively larger passage in the center of the cutting tip, thus providing a higly oxidizing flame capable of cutting through metal.

A main object of the invention is to provide an improved by-pass oxygen valve which is compact in construction and of such improved design that the valve seat and the valve head are provided as a unit which is readily replaceable. Furthermore the improved by-pass valve employs an internal stop device to limit the opening of the valve, whereby the head of the valve which formerly operated as such a stop does not become deformed through overcompression of the valve.

A preferred embodiment of the invention is given by way of example only as variations will occur to those skilled in the art.

The drawing is a sectional view showing the by-pass valve for the oxygen burning line.

After the objective metal plate or the like has been heated to the proper degree, the plate may be cut by supplying raw oxygen, under pressure, through the central passage way of the cutting tip under the control of a valve generally indicated at 30.

The valve 30 is a self contained unit including a sleeve 35 which is threaded into the section 3. The sleeve includes a valve seat 36 which cooperates with a valve head 37 in known manner. The upper end of the valve stem 38 is threaded while the head is slotted as at 39 to facilitate screwing of the valve stem 38 into a nut 40. The valve stem is threaded into the nut 40 after being passed through the sleeve throat 41 and prior to screwing the sleeve 35 into the body section 3. In the particular embodiment shown the nut 40 is of conventional hexagon shape and the sleeve is recessed, or broached as at 42 in similar hexagon shape, so that once the nut 40 is located within the broached recess 42, the nut and the sleeve are locked together while at the same time permitting the nut to be depressed to open the valve. The valve unit 30 is then screwed into the body of the torch as shown, by means of applying a wrench to the hexagon nut.

One of the shortcomings of prior valves has been that during opening of the valve, such opening has been limited only by contact of the valve head with the body section. Also since the valve stem has conventionally been held in closed position by a spring, which spring usually surrounds an elongated valve stem, the valve assembly has been of an excessively great length thus enlarging the size of the cutting torch.

According to the present invention the length of the valve is shortened by recessing the nut at 43 to provide an annular slot which receives the compression spring 44. One end of the spring therefor is in contact with the recessed end within the nut 40 while the opposite end of the spring abuts a packing ring which surrounds the valve stem. In this manner two advantages are obtained; the length of the valve stem may be shortened to thereby permit shortening of the entire valve assembly and the shoulder 45 acts as a stop for the nut 40 thus preventing damage to the valve head 37.

Furthermore since the opening movement of the nut 40 is limited by contact with the shoulder 45 as previously described the operator cannot over-compress the spring 44.

When the nut 40 is depressed and the valve is open the gas flows from the chamber 11 and past the valve head into a chamber 48 having a plurality of ducts 49 leading into an annular ring 50. The provision of the plurality of ducts 49 provides means whereby a great volume of gas may be conveyed through a very small valve assembly to the conventional gas tubes etc. This further aids in minimizing the size of the oxygen by-pass valve.

From the foregoing then it is seen that the improved by-pass oxygen valve which is compact in design, permits a great volume of gas to flow therethrough, prevents damage to the valve head, prevents over-compression of the valve spring, and permits replacement of the valve seat and head as a unit. Furthermore since the hexagon nut of the by-pass valve cannot be rotated there is no tendency of a handle to rotate the nut and cause unscrewing of the valve stem therefrom.

I claim:
1. A gas valve including a cylinder having a gas inlet port, a gas outlet port, and an external opening for receiving a self contained valve assembly, said assembly comprising: a sleeve insertable through the external opening into the cylinder; a valve stem within said sleeve and having a head on the interior end of the valve stem, which head fits on a gas inlet valve seat in said sleeve; gas-tight packing between the valve stem and the sleeve; gas outlet ports in said sleeve; a recess in the external end of the sleeve to receive a nut which is secured to the external end of the valve stem, said recess in the sleeve being non-circular in section across the axis of said sleeve and said nut being non-circular in configuration matching said recess of the sleeve and a portion of said nut fitting within said recess to prevent rotation of the nut and the valve stem relative to the sleeve; a spring located on the valve stem between the gas-tight packing and the nut for holding the valve in closed condition to prevent the passage of gas from the inlet port to the outlet port; a stop shoulder on said nut which cooperates with a shoulder on the sleeve to limit the opening movement of the valve stem; and means for adjusting the distance between the valve head and the nut prior to insertion of the sleeve into said cylinder to thereby adjust the distance between said stop shoulder on the nut and said shoulder on the sleeve.

2. A valve assembly as defined in claim 1 in which the distance between the valve head and an opposite interior wall of said cylinder is greater than the distance between said two shoulders whereby the valve cannot be forcibly opened to the extent that said head contacts said cylinder wall.

References Cited in the file of this patent

UNITED STATES PATENTS

| | | |
|---|---|---|
| 1,242,245 | Rutz | Oct. 9, 1917 |
| 1,280,068 | Moorhouse | Sept. 24, 1918 |
| 1,426,350 | Bronson | Aug. 22, 1922 |
| 1,808,968 | Plumley | June 9, 1931 |
| 2,001,487 | Doherty | May 14, 1935 |
| 2,062,422 | Meese | Dec. 1, 1936 |
| 2,628,062 | Weber | Feb. 10, 1953 |
| 2,669,415 | Gilroy | Feb. 16, 1954 |

FOREIGN PATENTS

| | | |
|---|---|---|
| 517,116 | Belgium | Feb. 14, 1953 |